July 24, 1923.

C. GRAF

PHOTOGRAPHIC OBJECTIVE

Filed Jan. 5, 1922

1,463,132

INVENTOR.
Christopher Graf
BY
ATTORNEY.

Patented July 24, 1923.

1,463,132

UNITED STATES PATENT OFFICE.

CHRISTOPHER GRAF, OF SOUTH BEND, INDIANA, ASSIGNOR TO RICHARD GRAF, OF SOUTH BEND, INDIANA.

PHOTOGRAPHIC OBJECTIVE.

Application filed January 5, 1922. Serial No. 527,241.

*To all whom it may concern:*

Be it known that I, CHRISTOPHER GRAF, a citizen of the United States, residing at South Bend, in the county of St. Joseph and State of Indiana, have invented certain new and useful Improvements in Photographic Objectives, of which the following is a specification.

This invention relates to photographic objectives.

It has been the general aim of lens designers since the inception of the art of photography to make an objective capable of producing a critically sharp image of an object. Since the invention of the optical glass lens, designers have succeeded in obtaining lens combinations which satisfy all requirements in regard to definition and speed.

It has been found, however, that pictures which have the required degree of sharpness often produce a weird effect. For various special purposes lens combinations have therefore been designed which create the impression of depth in contradistinction to the critically sharp, but flat images.

It is the object of this invention to provide an objective which is capable of producing an extremely sharp image and which may be readily adjusted to produce pictures of varying degrees of softness, in other words, a soft-focus objective and a high speed anastigmat in one and the same lens combination.

While there is a certain latitude in the construction and arrangement of lenses for carrying out the object, reference is made to two constructions which may be considered as the preferred embodiments of the invention, and which may be taken as generally representatives of the class of combinations involved.

Figure 1:
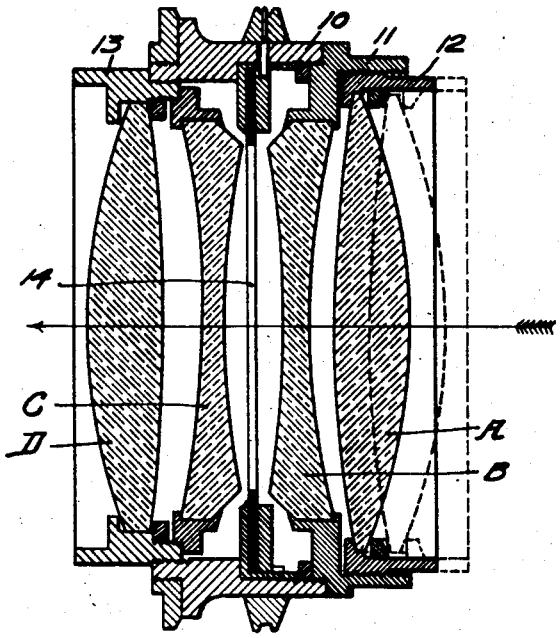
Figure 1 shows one lens combination embodying the invention.

Referring to the drawing, and especially to Figure 1, 10 designates a lens barrel into one end of which is screwed a lens holder 11 containing a convex lens A of crown glass and a negative lens B of flint glass. While the lens B is fixed in position, the front lens A is adjustable toward and away from lens B. For this purpose the lens A is contained in a separate holder 12 which has an external screw thread fitting a corresponding internal screw thread in the holder 11.

Into the other end of the barrel 10 is screwed a lens holder 13 containing in fixed relation the negative flint lens C and the positive crown glass lens D. The two sets of lenses are separated by the usual diaphragm 14. This lens combination may have an aperture ratio of 1:1.9 for objectives of short focal length and an aperture ratio of 1:4.5 to 1:3.5 in objectives of medium and long focal lengths. The axial thickness of the lenses A, B, C and D is 15 mm., 5 mm., 5 mm. and 15.5 respectively.

The diffusion of this objective is variable and a maximum when the lenses A and B are in the position indicated in full lines, that is, when lens A is close to B. The degree of diffusion is gradually decreased when the lens A is moved outwardly or away from lens B and critical sharpness or fine definition is obtained when the lens A is in its outermost position indicated in dotted lines.

The indices of refraction, powers of dispersion, etc., for satisfying the requirements of definition with the lens A in its outer position are a matter of computation.

Figure 2:
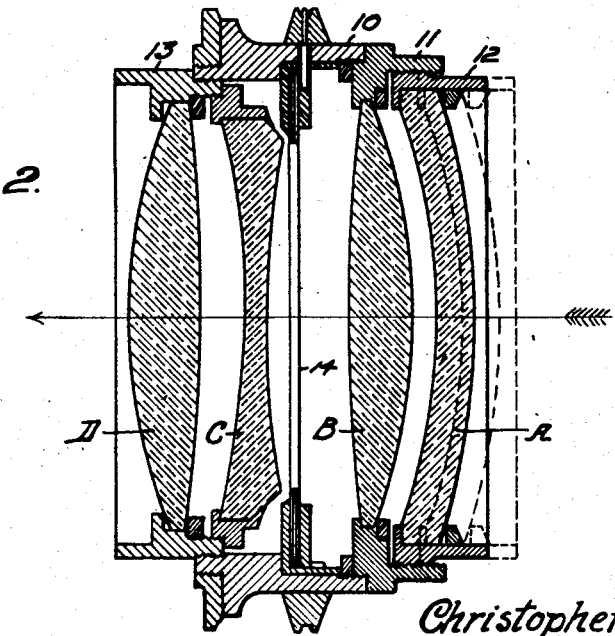
Figure 2 is a modification thereof.

The combination shown in Figure 2 is generally the same as in Figure 1. The lens A however is a negative flint and the lens B a positive crown lens. Other modifications within the scope of the disclosure will of course suggest themselves to the lens expert.

The invention having been set forth what is claimed as new and useful is:—

1. A photographic lens of the anastigmat type comprising a fixed back combination and an adjustable front combination including each two lenses separated by an air space, the arrangement being such that when the lenses of the front combination are in their relative position closest to each other an image of a desired maximum degree of diffusion is produced and that when they are moved away from each other, an increasingly sharper image is produced.

2. Lens according to claim 1 in which the anterior lens of the front combination is movable.

3. Lens according to claim 1 in which the front and the back combination are close together on opposite sides of a diaphragm.

4. Lens according to claim 3 in which the inner members are negative flints and the outer members are positive crowns.

5. Lens according to claim 4 in which the thickness of the lenses in consecutive order from front to back is approximately 15 mm., 5 mm., 5 mm. and 15.5 mm., respectively.

6. A photographic lens combination, comprising two pairs of lenses on opposite sides of a diaphragm, one pair of lenses and the inner lens of the second pair having a fixed position and the outer lens of the second pair being movable, and means for adjusting the position of said movable lens, the combination being so constructed that it produces an image of extreme sharpness when the movable lens is in one extreme position, an image of a definite degree of diffusion when the movable lens is in the other extreme position and images of different degrees of diffusion when the movable lens is in intermediate positions, the lenses being separated by air spaces.

7. A photographic lens of the anastigmat type comprising a fixed back combination, and an adjustable front combination, said front combination comprising two lenses separated by an air space and movable relatively to each other, the arrangement being such that when the lenses of the front combination are in their relative position closest to each other, an image of a desired maximum degree of diffusion is produced, and that when they are moved away from each other, an increasingly sharper image is produced.

In testimony whereof I affix my signature.

CHRISTOPHER GRAF.